(12) United States Patent
Chappell et al.

(10) Patent No.: US 7,944,848 B2
(45) Date of Patent: May 17, 2011

(54) UPSTREAM SIGNAL QUALITY MONITORING

(75) Inventors: Daniel K. Chappell, Greenwood, IN (US); David Hering, Greenwood, IN (US); Michael J. Kunczt, Greenwood, IN (US); Kelly Watts, Indianapolis, IN (US); Adam D. Gray, McCordsville, IN (US); David W. Jones, Pittsboro, IN (US)

(73) Assignee: Acterna LLC, Germantown, MD (US)

( * ) Notice: Subject to any disclaimer, the term of this patent is extended or adjusted under 35 U.S.C. 154(b) by 344 days.

(21) Appl. No.: 12/131,700

(22) Filed: Jun. 2, 2008

(65) Prior Publication Data
US 2008/0298270 A1 Dec. 4, 2008

Related U.S. Application Data

(60) Provisional application No. 60/941,763, filed on Jun. 4, 2007, provisional application No. 60/990,816, filed on Nov. 28, 2007.

(51) Int. Cl.
*H04L 12/26* (2006.01)

(52) U.S. Cl. ........................ 370/252; 370/480; 370/332

(58) Field of Classification Search .................. 370/480, 370/419
See application file for complete search history.

(56) References Cited

U.S. PATENT DOCUMENTS

| | | | |
|---|---|---|---|
| 2005/0047442 A1* | 3/2005 | Volpe et al. | 370/480 |
| 2006/0230423 A1* | 10/2006 | Burgett et al. | 725/107 |
| 2008/0200129 A1* | 8/2008 | Cooper et al. | 455/67.14 |
| 2008/0242225 A1* | 10/2008 | Krishnamoorthi et al. | 455/9 |

* cited by examiner

*Primary Examiner* — Dang T Ton
*Assistant Examiner* — Pamit Kaur
(74) *Attorney, Agent, or Firm* — Matthew A. Pequignot; Pequignot + Myers LLC

(57) ABSTRACT

The problem is that a measurement of the average signal quality (average modulation error ratio), does not identify poor quality signals that may be originating from an individual cable modem. The device of the present invention displays the modulation error ratio (MER) for each packet received. Since the media access control (MAC) address is associated with a packet received from an individual cable modem, a graph displaying the MER for each packet received is also displaying the MER for signals from the individual cable modems. Thus a technician viewing the display will be able to identify whether a low MER is a result of an impairment in the network or the from an individual cable modem.

12 Claims, 6 Drawing Sheets

UPSTREAM SIGNAL QUALITY MONITORING

CROSS-REFERENCE TO RELATED APPLICATIONS

The present invention claims priority from U.S. Patent Application No. 60/941,763 filed Jun. 4, 2007, entitled "Upstream Signal Quality Monitoring", by Chappell, and the present invention claims priority from U.S. Patent Application No. 60/990,816 filed Nov. 28, 2007, entitled "Monitoring Upstream quality by using MER on a CATV network", by Chapell et al., which are incorporated herein by reference for all purposes.

TECHNICAL FIELD

The present invention relates to monitoring and displaying dynamic quality information of TDMA carriers over time and different transmitters, and in particular to identifying impairments in the upstream channels of a CATV type bi-directional network using cable television protocols, such as DOCSIS or OCAP protocols.

BACKGROUND OF THE INVENTION

The upstream path of the current Cable Television Data-Over-Cable Service Interface Specification (CATV DOCSIS) or Open Cable Application Protocol (OCAP) communication scheme can be impaired for various reasons. FIG. 1 illustrates a conventional cable TV network that has DOCSIS or OCAP internet access. A Cable Modem Termination System 1 (CMTS) has three connections: 1) a network interface to servers 17 via the internet 16; 2) downstream control and data delivery via a signal combiner 2; and 3) upstream control and data reception via a signal splitter 3. FIG. 1 illustrates one "Node" of a CATV plant, which serves up to 200 homes with DOCSIS or OCAP service. Often a "Hub" will have over one hundred Nodes and a city the size of Indianapolis can have five or six hub sites.

The downstream signal of the CMTS 1 is coupled with the other signals, e.g. TV, Test, Telephony or others, via the Signal Combiner 2. The output of the Signal Combiner 2 is connected to a Fiber Transceiver Node 4, which converts the combined downstream signal suite from RF signals to optical signals, and delivers the combined signal suite to a remote location via a fiber optic link 5. The downstream optical signals are converted back to RF signals at a Transceiver Node 6, which is also optically coupled to the optical link 5. The RF signals from the transceiver node 6 are delivered to different residences via a cable Distribution Network 7. Certain residences 8, 9 and 10 use cable modems CM1, CM2 and CM3, respectively. A control signal from the CMTS 1 is detected and demodulated by each of the cable modems CM1, CM2 and CM3. When a cable modem, e.g. CM1, CM2 or CM3, wants to talk back to the CMTS 1, the cable modem will wait until the CMTS 1 indicates that the upstream path is free, the cable modem then requests a time slot from the CMTS 1 via an upstream signal. The upstream signal is coupled to the distribution network 7, and then converted to an optical signal at the fiber transceiver 6. The upstream optical signal travels back to the hub site or head-end via optical cable link 15, where the fiber transceiver 4 optically connected to the optical cable link 15, converts the upstream optical signal back to an RF signal. The upstream RF signal is then routed to the signal splitter 3, where a portion of the upstream signal is sent to the CMTS 1. The CMTS 1 thus becomes the link between the cable modems CM1, CM2 and CM3 and the servers 17 via the internet 16.

Time division multiplexed access (TDMA) is the preferred communication link, since each cable modem CM1, CM2 and CM3 is randomly picking a time to request upstream signal transmissions, and packet sizes from the cable modems CM1, CM2 and CM3 vary. Various other systems and features can be applied which extend the behavior and improve noise immunity, but essentially TDMA is used. The cable modem transmissions, i.e. bursts, are at random intervals from an outsiders point of view.

Referring to FIGS. 1 and 2, each cable modem CM1, CM2 and CM3 will transmit a packet 19 or series of packets 11, 12 and 13, respectively, in either a blank time slot identified by the CMTS 1 or into a scheduled timeslot assigned by the CMTS 1. The distribution network 7 combines all of the CM packet series 11, 12 and 13 together into a single upstream signal 14, whereby all of the individual series are indistinguishable from an outside observer. OCAP operates similarly to the DOCSIS protocol and engineers familiar with the state of the art would see the commonalities and differences, in particular OCAP is used for set-top box command and control.

A problem exists for upstream path monitoring in the DOCSIS 3.0. protocol, because DOCSIS is improving the upstream path bandwidth, building in the capacity for quadrupling or more the amount of data that will be sent back to the CMTS 1 by using four data channels instead of the one or two channels currently in use. Accordingly, the CATV upstream path is becoming more crowded, which presents a problem for return path monitoring. The spectrum which was formerly empty now contains signals, and looking for noise is more difficult; accordingly, better ways are needed to prove that the CATV upstream path is performing optimally. New monitoring systems must be able to monitor in a crowded or full upstream spectrum.

The conventional method of monitoring consists of setting thresholds for specific frequencies from a spectrum scan. If the signal crosses these thresholds, it is assumed that there is a problem on the network; unfortunately, this can lead to false prioritization for node repair. Monitoring MER is one method of gauging active channel performance without counting on empty spectrum. Since bad MER is the equivalent of losing data, and the multiple service operator's (MSO) revenues are based on both modem data traffic and set-top box data traffic, setting alarms based on these raw numbers is a more effective way of prioritizing nodes to work on. Combine this with the current monitoring statistics, and the user will find out when they can schedule field maintenance with a metric that has a direct impact on revenue.

Currently there is hardware, Filtronics model ST-260C DOCSIS 2.0 Protocol Analyzer1, that monitors the upstream signal 14, and can determine which cable modem is transmitting packets; however, in monitoring or remote applications attaching a monitoring device to every CMTS downstream thereof would be cost prohibitive. United States Patent Publication No. 2005/0047442 published in the name of Volpe et al. on Mar. 3, 2005, describes a system in which a MAC address associated with a specific cable modem can be entered, and the signal quality of the upstream channel from the specific cable modem can be determined.

The distribution network, illustrated in FIG. 1, has a number of possible impairments that can affect the CM upstream signal 14. Some of the impairments affect every cable modem, whereas other impairments affect only a subset of modems. Another object of the present invention is to find the impairments that affect only a subset of the cable modems.

SUMMARY OF THE INVENTION

Accordingly, the present invention relates to an apparatus for monitoring an upstream signal, which includes a plurality of packets from a plurality of cable modems, in a CATV bi-directional network using a cable protocol, each cable modem having a unique MAC address, comprising:

a first demodulator for receiving and demodulating the packets in the upstream signal;

a first controller for determining a modulation error ratio (MER) for each packet;

a graphical user interface for displaying the MER for each packet as a function of the received packet number;

whereby problems with the CATV network and problems with individual cable modems are observable.

Another feature of the present invention relates to a method for monitoring an upstream signal, which includes a plurality of packets from a plurality of cable modems, in a CATV bi-directional network using a DOCSIS or an OCAP protocol, each cable modem having a unique MAC address, comprising the steps of:

a) demodulating the packets in the upstream signal;

b) determining a modulation error ratio (MER) for each packet received; and c) displaying the MER for each packet as a function of the received packet number;

whereby network problems causing low MER, and individual cable modems causing low MER are identifiable.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
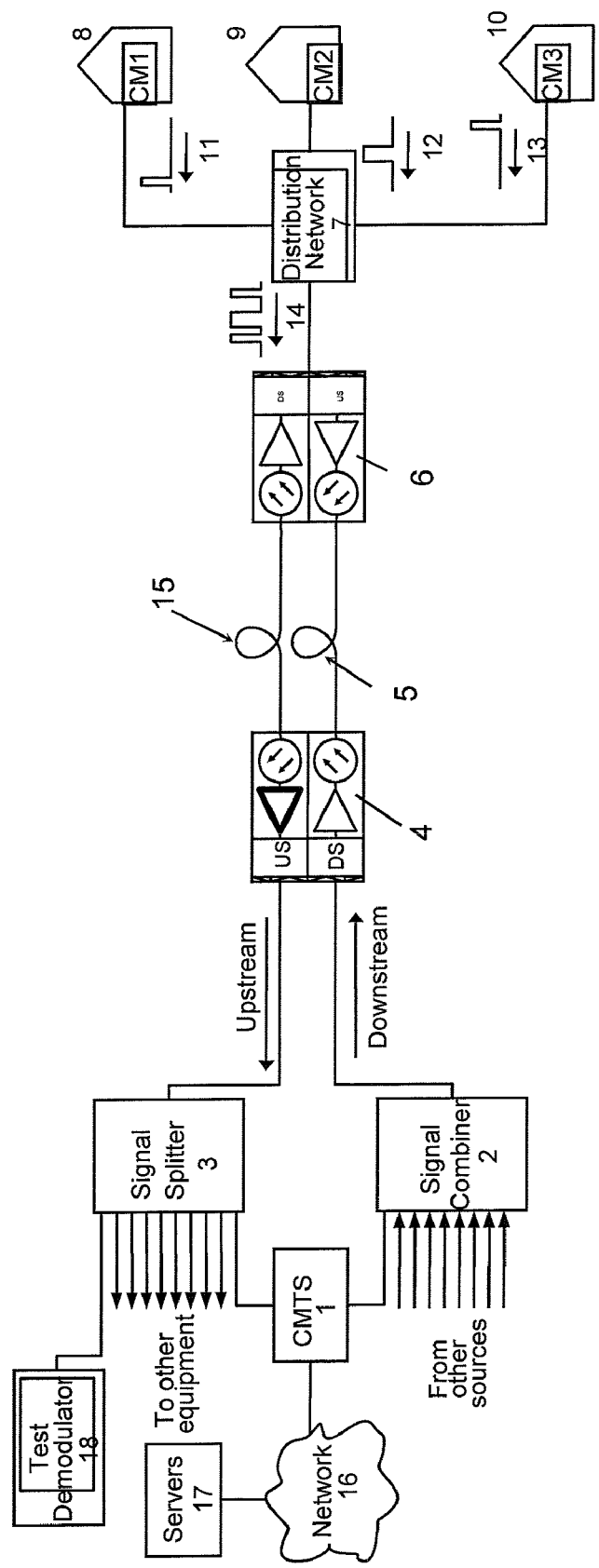
FIG. 1 is a schematic representation of a CATV network.

Monitoring MER instead of level, gives the customer more meaningful information about the health of the upstream path, i.e. a real metric of how much revenue is impacted by noise. Monitoring with levels is ambiguous and at best an educated guess as to whether the upstream signals are being impacted by noise on the system. Conventional alarms are generated and work is scheduled based on these guesses, when the noise could be completely benign to the upstream path being monitored.

Monitoring MER for each incoming packet shows the Cable Operator the customer's upstream signal quality hitting the signal splitter 3 in the CATV network headend. MER quality is a direct indicator of how the upstream signal 14 is impacted by noise. Measuring the MER multiple times per second and building statistical models for the MER will give the MSO a real actionable alarm or warning. Nodes will be prioritized based on the quality of the MODEM signal getting back to the headend. Displaying MER values and packet numbers will give the technician further information as to who and where the problem exists, e.g. whether all the packets have high MER indicative of a network problem or only a subset of the packets have high MER, indicative of a node or a cable modem problem. Moreover, specific location information can be obtained, when the MAC address is obtained from the packet and cross referenced to a customer database of cable modems. Furthermore by checking the equalizer taps and decoded I/Q data for failing packets recovered from the demodulator 25, as is well known in the art, the cause of the data transmission failure can be identified.

Each node of a DOCSIS network has at least one upstream carrier, which can be affected by noise, ingress, CPD, micro-reflections and non-linear distortions. Each headend engineer is aware of what signals should be on the upstream path in order for a well designed node to have a constant power per Hertz for each signal on the upstream. In order to monitor these signal the system has to have recorded an upstream channel plan that spells out the known components on the upstream, what each of their bandwidths are, and what kind of modulation is used on them and when to alarm the engineer.

Exemplary Channel Plan Contents include: a) Name; b) Center Frequency (MHz); c) Carrier Type; d) Modulation Rate (MSPS); e) Carrier Bandwidth (MHz); f) Maximum Carrier Level (dBmV); g) Minimum Carrier Level (dBmV); h) Warning MER Threshold (dB); i) Warning Percentage (%)

Since the upstream path has a less defined frequency plan than the downstream path, a channel number may not be appropriate for the upstream plan index; however, the channel function or name would be appropriate, since the engineer will be aware of the use of this channel.

a) Name is a character field that the user can define the identifier for the upstream channel b) Center Frequency is the frequency in MHz of the carrier to be tested.

c) Carrier Type will be one of several selections including: DOCSIS QPSK, DOCSIS QAM16, DOCSIS QAM64, DOCSIS Mixed Mode, OCAP, Custom d) Modulation Rate is one of several predefined modulation rates that the customer can select from covering DOCSIS and OCAP carrier types, with Custom carrier type the modulation rate will be blanked out. DOCSIS carriers will be selected from the following symbol rates: 5.12 MSPS, 2.56 MSPS, 1.28 MSPS, 0.64 MSPS, 0.32 MSPS, 0.16 MSPS. The OCAP symbol rates will be selected from: 0.256 MSPS, 1.544 MSPS, 3.088 MSPS.

e) The Carrier Bandwidth will be automatically selected when a DOCSIS or OCAP carrier is selected from the modulation Rate. When a custom type is selected, the various RBW filters will be listed for the customer to select the closest bandwidth. When a custom type is selected, only carrier level is monitored, modulation information will be N/A.

f) Maximum Carrier Level is an upper threshold level that can be used for two separate tests: first, if a predetermined Warning Percentage, e.g. 10%, 5%, 2% or 1%, of the modem burst power level of each packet rises above a Maximum Carrier Level threshold a "Yellow Alert" will be thrown at the end of a 15 minute test period. If the overall average of the modem burst power levels for the modem traffic rises above the Maximum Carrier Level threshold, a "Red Alert" will be thrown.

g) Minimum Carrier Level is a lower threshold level, which can be used for two separate tests; first, if a predetermined Warning Percentage, e.g. 10%, 5%, 2% or 1%, of the modem burst power level of each packet falls below a Minimum Carrier Level threshold a "Yellow Alert" will be thrown at the end of the 15 minute test period. If the overall average of the modem burst power levels for the modem traffic falls below the Minimum Carrier Level threshold, a "Red Alert" will be thrown.

h) Warning MER Threshold is a lower threshold level, which can be used for two separate tests: first, if a predetermined Warning Percentage, e.g. 10%, 5%, 2% or 1%, of MER values determined for each packet in the upstream signal 14 fall below the Warning MER Threshold a "Yellow Alert" will be thrown at the end of the 15 minute test period. If the overall average of the MER values for the packets in the upstream signal 14 falls below the Lower MER Threshold, a "Red Alert" will be thrown.

Default values for the Lower MER Threshold can be selected for the customer based on a 3 dB above minimum lock value. For instance, QAM 16 can lock at 16 dB MER so the Lower MER Threshold should automatically be set to 19 dB. Table 1 shows exemplary Lower MER Thresholds for each modulation type:

TABLE 1

Lower MER Threshold Warning Defaults

| Type | Default |
| --- | --- |
| QPSK | 13 dB |
| QAM 16 | 19 dB |
| QAM 64 | 25 dB | i) Warning Percentage is the amount of traffic allowed to have "bad MER" before an alert is sent, e.g. 10%, 5%, 2% or ideally a default value of 1% is used.

Figure 2:
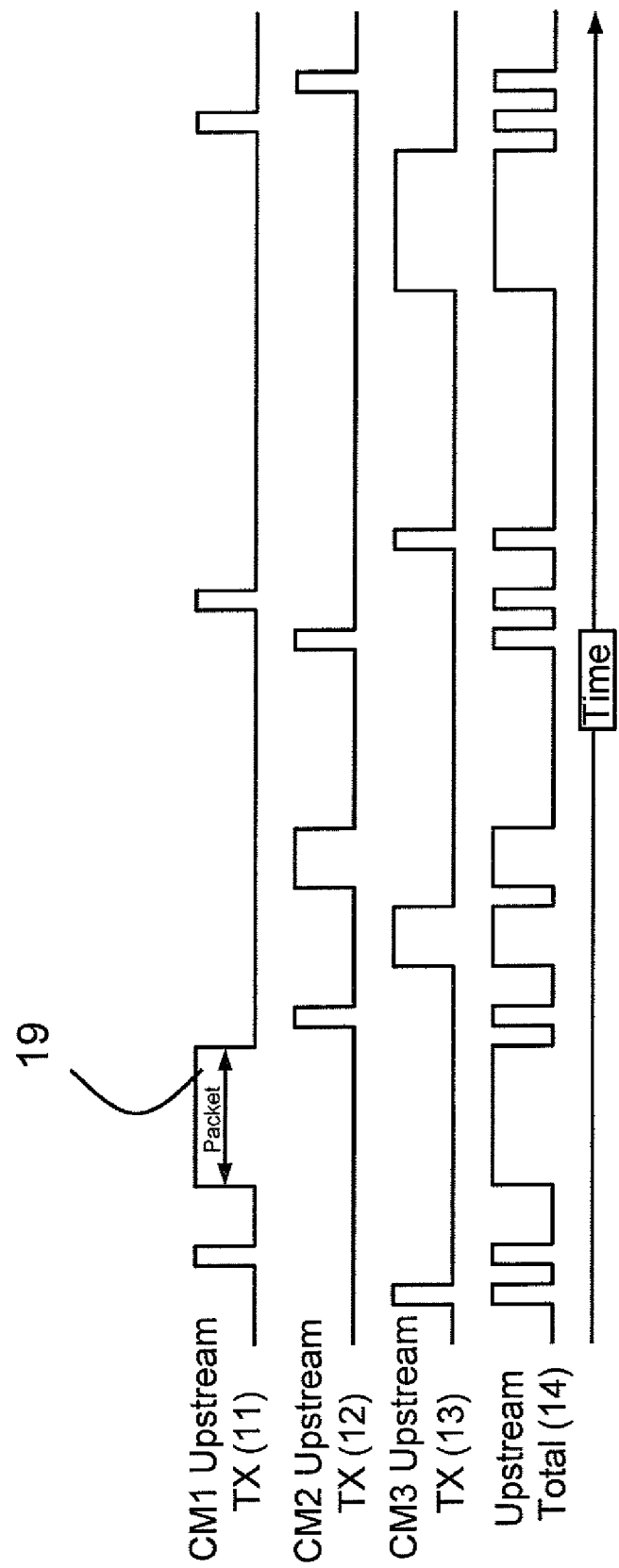
FIG. 2 illustrates individual and combined cable modem upstream signals.
Figure 3:
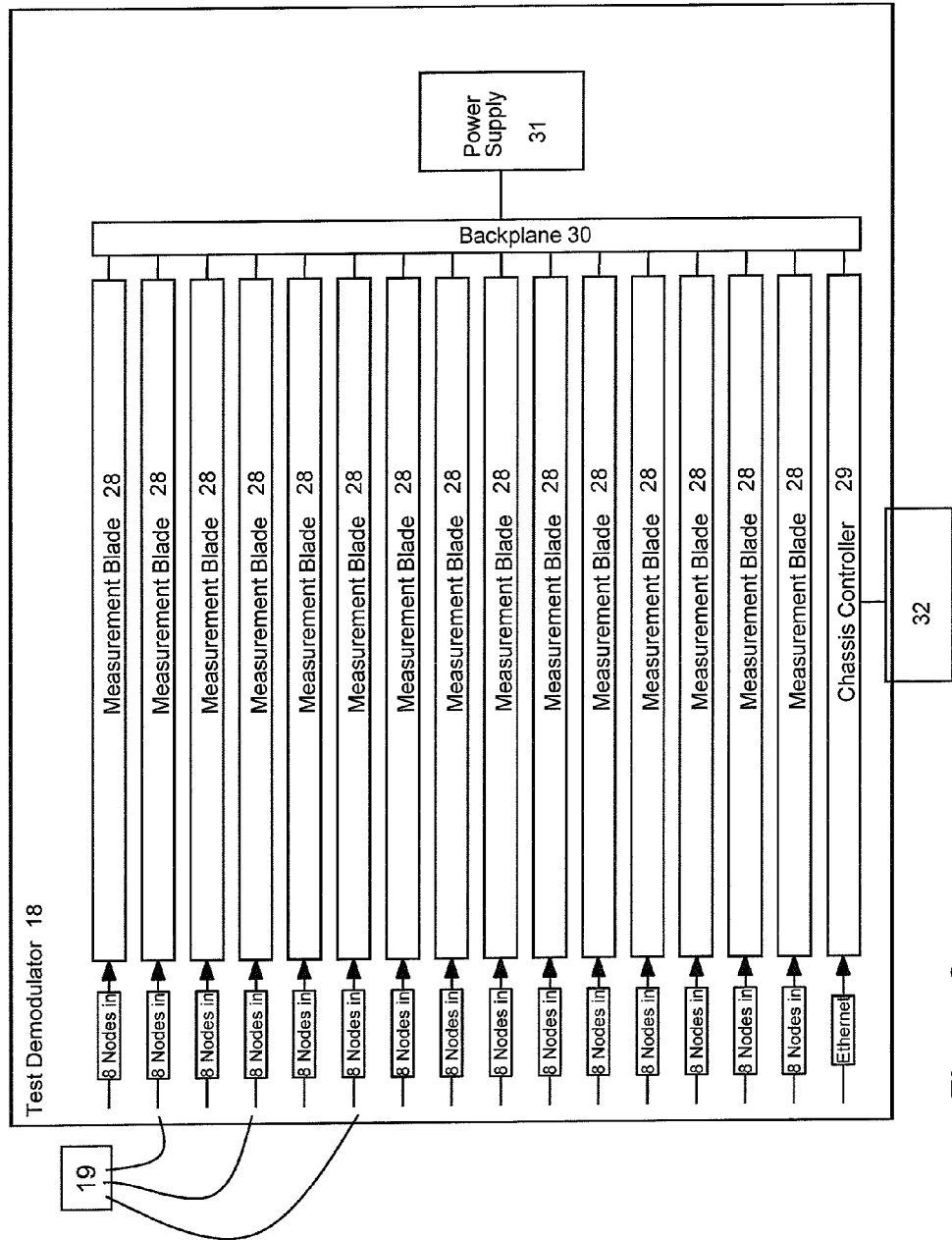
FIG. 3 is a schematic representation of a test demodulator according to the present invention.

With reference to FIG. 3, in accordance with the present invention, a combined upstream signal 14, as detailed above with reference to FIGS. 1 and 2, is transmitted to a testing device 18, e.g. a JDSU PathTrak™ system modified to demodulate an upstream carrier. The testing equipment 18 can have hundreds of inputs 19 to accommodate the hundreds of nodes in a hub site, which is achieved by having a scalable test device system adaptable to accommodate a large number of measurement blades 28. Each test device 18 has a power supply 31, a chassis controller 29, a back-plane 30 and at least one measurement blade 28 plugged into, i.e. electrically connected, to the back-plane 30. The chassis controller 29 configures each measurement blade 28 through the back-plane 30 and communicates to the outside world via a graphical user interfaces (GUI) display 32. Each measurement blade 28 runs tasks scheduled by the chassis controller 29.

The test equipment 18 demodulates the combined upstream carrier signal 14 for multiple packets. The standard quality metric for a DOCSIS or OCAP carrier is Modulation Error Ratio or MER. Measuring average MER over a period of time from the upstream signal, has limited value; however, a plot of the MER of each valid packet can be used to identify poorly performing cable modems. According to an embodiment of the present invention, the test equipment 18 demodulates the signal 14, calculates the MER for each individual signal, determines the MAC address for each signal, and displays the information enabling a technician to see and determine whether individual cable modems are the cause of low MER.

Figure 4:
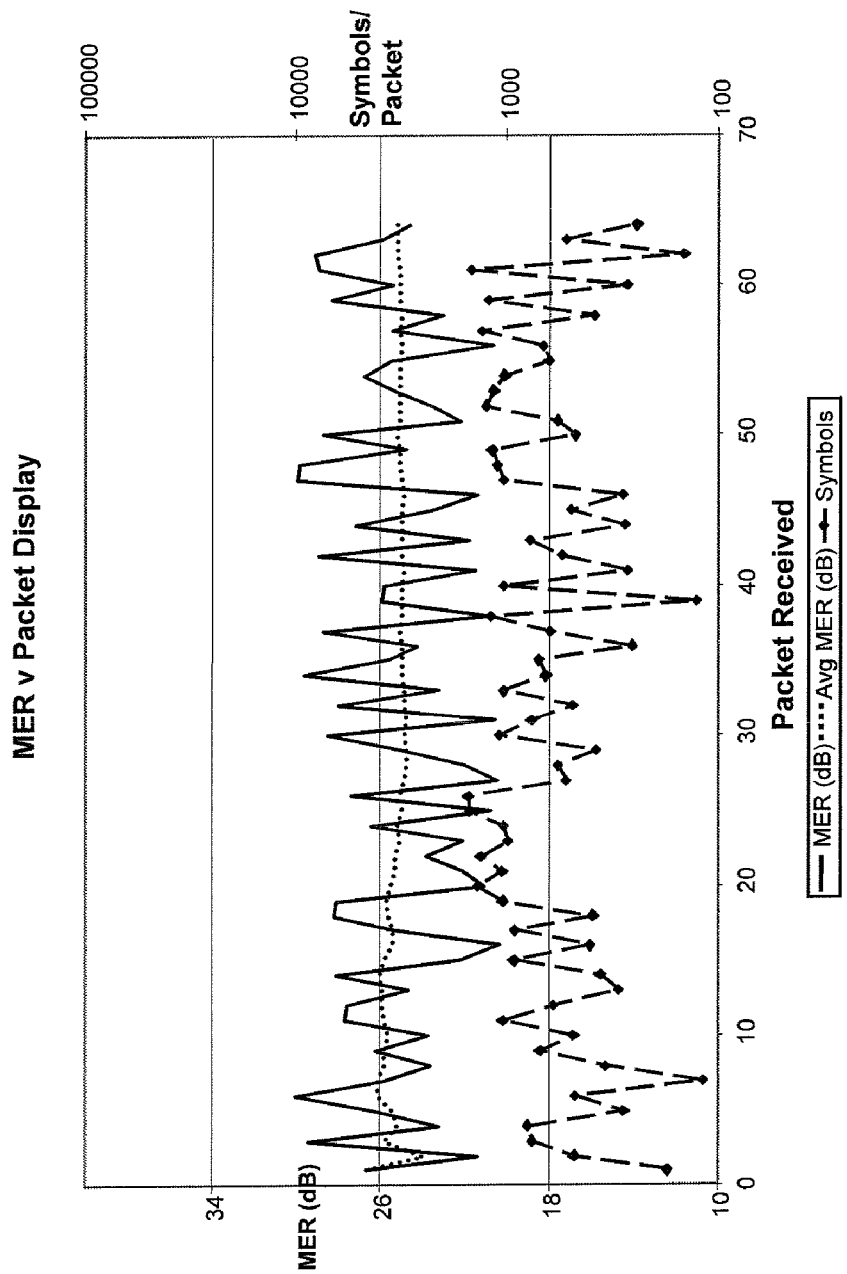
FIG. 4 is a plot of MER vs packet received.

FIG. 4 illustrates three traces viewable on the graphical user interface 32: the lower trace (with square points) is the quantity of symbols or data transmitted in the packet. The upper solid trace is the MER for the each packet measured, and the dotted trace is the average MER over packets 1 to n, where n is the packet number. If a technician is interested in a particular packet, i.e. the packet has an MER value that falls below a certain MER level, e.g. the Lower MER Threshold above, the device will use the stored I and Q values to determine the unique address, Media Access Control or MAC address, of the cable modem, e.g. CM1, since the MAC address is transmitted at the beginning of each packet. Therefore each point on the graph of FIG. 4 has a MAC address associated with it, accessible by the technician via display 32; accordingly, when a technician looks at the graphs of FIG. 4 on the display 32, they will be able to see the varying MER, determine if the varying MER is caused by a single cable modem or by plant variations in the network. By cross referencing the MAC addresses to a customer database, the technician will be able to localize the problem either to a home or a branch of the network. Furthermore, when the device is a longer term monitoring mode, e.g. for periods of time such as a day, a week or a month, the chassis controller 29 can compare each MER value to a threshold value stored in memory associated with the controller 29, if this threshold is exceeded which is indicative of a faulty cable modem, then the in-phase quadrature (I-Q) information from the demodulation can be stored in the memory for analysis later. The measurements illustrated in FIG. 4 can be done on a continuous basis or on a sampled basis.

Figure 5:
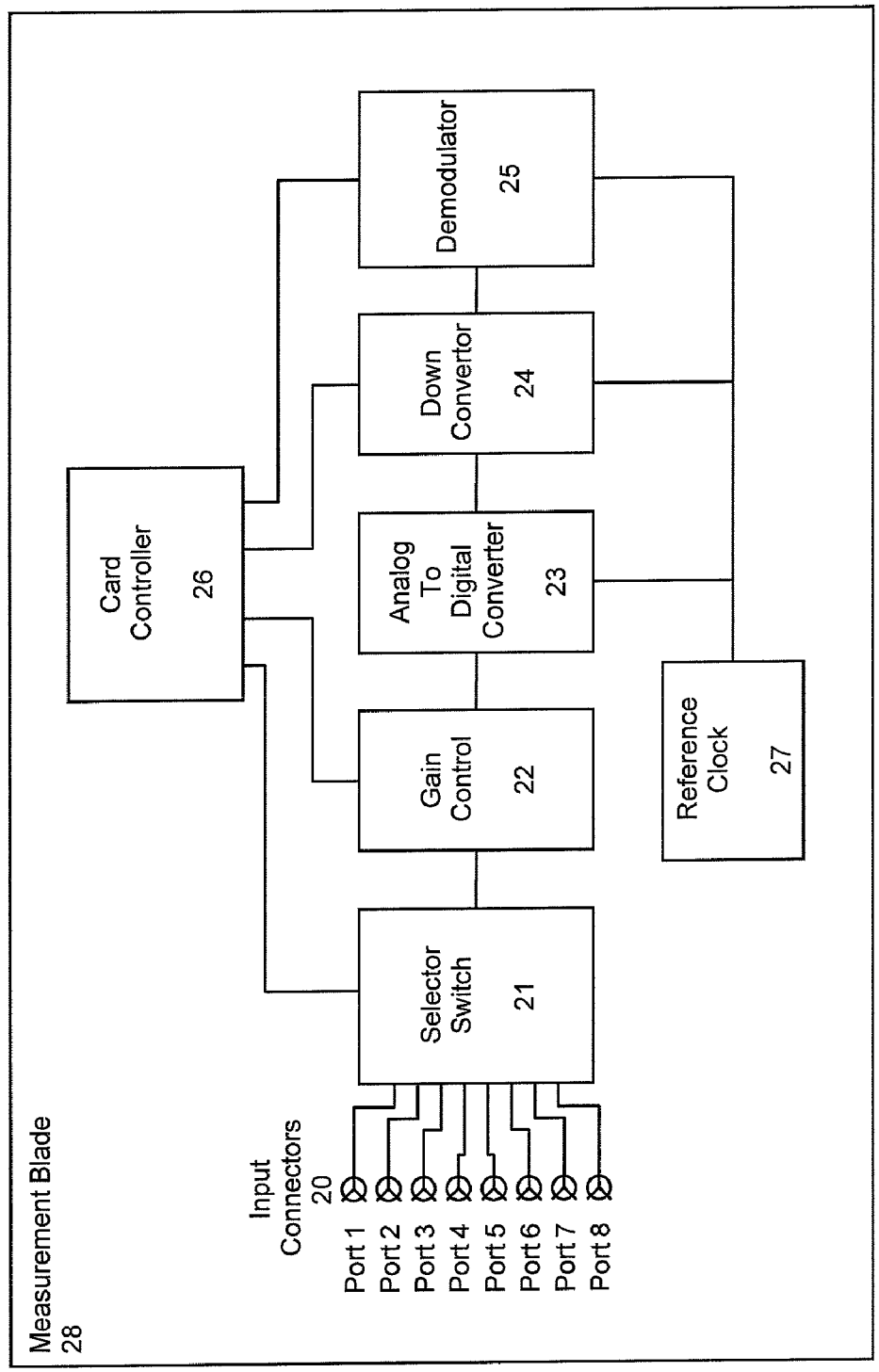
FIG. 5 is a schematic representation of a measurement blade of the test modulator of FIG. 3.

FIG. 5 illustrates one of the measurement blades 28 with eight different input ports, i.e. port 1 to port 8, making up an input connector 20 for connection to eight different nodes in a CATV network, as in FIG. 1. A card controller 26 controls a selector switch 21 and selects one of the ports, e.g. port 1, i.e. one of the hubs, for testing. A gain control device 22 connected to the selector switch 21 is adjusted under control of the card controller 26 to match the known amplitude of the selected node in the CATV network to an analog to digital converter (ADC) 23 connected to the gain control 22. The ADC 23 is clocked utilizing reference clock 27 at a frequency at least two times the highest frequency on the upstream path. A down converter 24 selects the upstream channel to demodulate, and routs the selected upstream channel to a demodulator 25. The demodulator 25 then feeds the MER information to the card controller 26, which reports to the chassis controller 29 to be delivered to the outside world via the display 32, logged away in memory for viewing later or collected for statistics or trend analysis.

At regular intervals the card controller 26 will start a task, which instructs the selector switch 21 to select a port (port 1 to 8) to be measured and the modem frequency to be monitored. The demodulator 25 will then capture the CM signal 14 and demodulate. The results of demodulation, the MER value and the number of symbols in the packet captured, will be stored in a memory array which is passed to the card controller 26. The card controller 26 then passes the value array to the chassis controller 29. The chassis controller 29 will store this array away in memory until the user decides to view the data. The user will request the data from the GUI display 32. The GUT display 32 then requests the time frame and port that is under test from the chassis controller 29. The chassis controller 29 will then sort the data and pass it to the GUT display 32. The GUT display 32 will then format the data and plot it on a strip chart (FIG. 4).

The MER value contains a lot of valuable information. Keeping only the maximum and minimum values for a predetermined time period leaves a lot of gathered, valuable information un-mined. According to another embodiment of the present invention, a histogram is constructed for each DOCSIS and OCAP upstream channel. The histogram is stored for a predetermined time interval, e.g. 15 minutes, and collected by test instrument 18, e.g. a PathTrak. Each histogram will have a lower MER bound of the Lower MER Threshold and ten different MER values in 1 dB increments. The 10th interval will collect all MER values greater than the Lower MER Threshold +10 dB. Accordingly, the number of MER values that are getting close to the Lower MER Threshold can also be identified, providing an indication of impending problems, and thereby enabling the technician to solve the problem before the service is noticeably interrupted. See Table 2 for an example of a QAM 64 Histogram.

TABLE 2

Example Histogram

| MER (dB) | Count |
|---|---|
| <19 | 15 |
| 19 | 18 |
| 20 | 17 |
| 21 | 20 |
| 22 | 25 |
| 23 | 35 |
| 24 | 86 |
| 25 | 122 |
| 26 | 250 |
| >26 | 3012 |

The histogram shows that fifteen packets had MER values worse than 19 dB MER, i.e. the Lower MER Threshold, which represents only 0.4% of total traffic. Accordingly, if the customer would have had the Warning Percentage set to 1%, a yellow alert would not have been thrown. Furthermore, it is obvious that the majority of the modem packets in this time interval, e.g. 15 minutes, are 10 dB above the Lower MER Threshold, i.e. greater than 26 dB.

Figure 6:
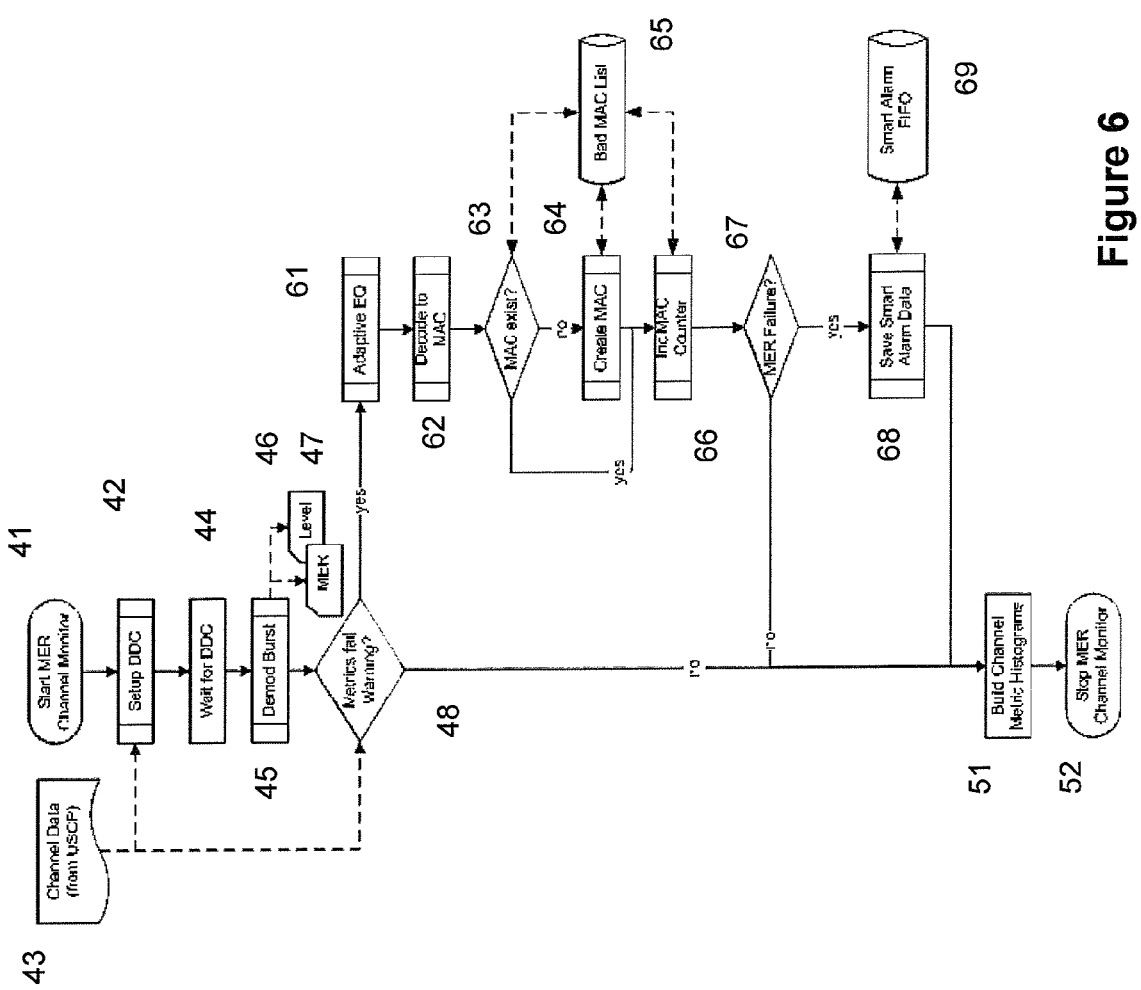
FIG. 6 is a flow chart of a method of the present invention.

According to an embodiment of the present invention, only when the Lower MER Threshold is crossed does the demodulator 25 further processes the data to extract the Modem MAC address and equalizes the signal. With reference to the flow chart in FIG. 6, the chassis controller 29 or the individual card controller 26 initiate an MER channel monitoring sequence at step 41. When the Monitoring period begins 41 the system will get the Upstream Channel Plan (JSCP) 43 information. Using the settings in the USCP the system will set the Digital Down Convertor (DDC) 24 up for the channel being monitored. The system will then wait until a modem packet 19 is captured. Once the capture is complete the demodulator 25 will extract the MER and Level information. As above, the testing device 18, in particular demodulator 25 demodulates the upstream signal 14 (Step 45), and determines the signal level and MER for each packet burst (Steps 46 and 47). If the predetermined Warning Percentage of MER values never falls below the Lower MER Threshold (Yellow Alert) or if the overall average of the MER never falls below the predetermined Lower MER Threshold value (Red Alert) for any of the packet series, e.g. 11, 12 and 13, then the process proceeds directly to build a metric, e.g. MER, histogram (Step 51) for the upstream channel, as in Table 2 above.

If the predetermined Warning Percentage of MER values for the packets in upstream signal 14 falls below the Lower MER Threshold (Yellow Alert) or if the overall average of the MER values falls below the predetermined Lower MER Threshold value (Red Alert) for any of the packet series then the process proceeds to step 61, in which adaptive equalization takes place, and to step 62 in which the MAC address for the packet bursts with low MER are determined. For each 15 minute interval each MAC address with a low MER gets a counter. Step 63 and 64 will maintain a list of MAC addresses for the monitoring period that is kept in database 65. At the beginning of the monitoring period, there have been no designated bad MAC addresses, so the list is empty. As a packet is determined bad, the list 65 is checked to see if the MAC address exists. If it does, the counts is incremented. If it doesn't exist, a MAC address is created and a count for it is started. Only MAC addresses that fail in that 15 minute interval will have a counter for that period (Step 66).

In Step 68, the MER Level, the corresponding MAC address, and the port of the last ten MAC addresses to fall below the Lower MER Threshold will be stored in FIFO memory 69, which holds more information, e.g. the MAC address, the MER level, the frequency, and IQ data, and is saved for those ten bursts for that 15 minute period. The Equalizer taps are also stored for that burst, whereby at a later time the data can be further processed to determine if the reason for poor MER was ingress, noise, or micro-reflections.

As above, the process proceeds to step 51 to construct a histogram for the upstream channel, as in Table 2 above.

We claim:

1. An apparatus for monitoring upstream signals, each of which includes a plurality of packets from a plurality of cable modems, in a CATV bi-directional network using a cable protocol, each cable modem having a unique MAC address, the apparatus comprising:
   a plurality of modules, each module comprising:
      a demodulator for receiving and demodulating the packets in one of the upstream signals;
      a controller for determining a modulation error ratio (MER) for each packet;
      an analog to digital converter clocked at a frequency at least two times the highest frequency of the upstream signal;
      a gain control device adjusted to match a known amplitude of a selected node to the analog to digital converter; and
      a down converter for selecting the upstream channel to demodulate and route to the demodulator;
   a main controller for controlling the plurality of controllers; and
   a backplane for electrically connecting the plurality of modules with the main controller;
   a graphical user interface for displaying the MER for each packet as a function of the received packet number;
      whereby problems with the CATV network and problems with individual cable modems are observable;
      wherein the controller also determines whether a predetermined percentage of MER values falls below a predetermined minimum value over a predetermined time period and generates a warning signal if the predetermined percentage of MER values fall below the predetermined minimum value.

2. The apparatus according to claim 1, wherein the controller also determines whether the MER of each packet falls below predetermined threshold value, and also determines the MAC address of the packets with MER exceeding the predetermined threshold value for identifying faulty cable modems.

3. The apparatus according to claim 1, wherein each module also comprises a plurality of ports for receiving a plurality of cables; and a selector switch for selecting one of the ports, corresponding to a hub in the CATV network, for testing.

4. The apparatus according to claim 3, wherein the graphical user interface also displays the number of symbols/packets in the upstream signal.

5. The apparatus according to claim 4, wherein the graphical user interface also displays the average MER for all the packets in the upstream signal.

6. A method for monitoring an upstream signal, which includes a plurality of packets from a plurality of cable modems, in a CATV bi-directional network using a DOCSIS or an OCAP protocol, each cable modem having a unique MAC address, comprising the steps of:
   a) demodulating the packets in the upstream signal;
   b) determining a modulation error ratio (MER) for each packet received;
   c) displaying the MER for each packet as a function of the received packet number;
   d) generating a histogram of MER values including the number of packets having an MER values below a minimum threshold value, the number of packets having an MER value above a maximum threshold value, and the number of packets having MER values at incremental values between the minimum and maximum threshold values; and
   e) displaying the histogram on the graphic user interface;
   whereby the number of packets with MER values close to the minimum predetermined value are identifiable;
   whereby network problems causing low MER, and individual cable modems causing low MER are identifiable.

7. The method according to claim 6, wherein further comprising determining whether a predetermined percentage of MER values falls below a predetermined threshold value over a predetermined time period, and generating a warning signal if the predetermined percentage of MER values falls below the predetermined maximum value over the predetermined time period.

8. The method according to claim 7, wherein the predetermined percentage of MER is less than 2%, and wherein the predetermined maximum value is 3 dB above a minimum lock value of a carrier type of the upstream signal, and wherein the predetermined time period is up to fifteen minutes.

9. The method according to claim 6, further comprising determining whether the MER for each packet falls below a predetermined threshold value, and determining the MAC address of the packets with MER falling below the predetermined threshold value for identifying faulty cable modems corresponding thereto.

10. The method according to claim 9, further comprising accessing equalizer tap and I-Q data of the packets with MER falling below the predetermined threshold value for identifying causes for the low MER.

11. The method according to claim 6, wherein step c) also includes displaying the number of symbols/packets in the upstream signal.

12. The method according to claim 11, wherein step c) also includes displaying the average MER for all the packets in the upstream signal.

* * * * *